(12) United States Patent
Maier (10) Patent No.: US 8,079,805 B2
(45) Date of Patent: Dec. 20, 2011

(54) ROTARY SEPARATOR AND SHAFT COUPLER FOR COMPRESSORS

(75) Inventor: William C. Maier, Almond, NY (US)

(73) Assignee: Dresser-Rand Company, Olean, NY (US)

( * ) Notice: Subject to any disclaimer, the term of this patent is extended or adjusted under 35 U.S.C. 154(b) by 758 days.

(21) Appl. No.: 12/215,069

(22) Filed: Jun. 25, 2008

(65) Prior Publication Data

US 2009/0324391 A1 Dec. 31, 2009

(51) Int. Cl.
*F01D 25/32* (2006.01)

(52) U.S. Cl. ..................... 415/115; 415/169.2

(58) Field of Classification Search ............ None
See application file for complete search history.

(56) References Cited

U.S. PATENT DOCUMENTS

| | | |
|---|---|---|
| 815,812 A | 3/1906 | Gow |
| 1,057,613 A | 4/1913 | Baldwin |
| 1,061,656 A | 5/1913 | Black |
| 1,480,775 A | 1/1924 | Marien |
| 1,622,768 A | 3/1927 | Cook et al. |
| 1,642,454 A | 9/1927 | Malmstrom |
| 2,006,244 A | 6/1935 | Kopsa |
| 2,300,766 A | 11/1942 | Baumann |
| 2,328,031 A | 8/1943 | Risley |
| 2,345,437 A | 3/1944 | Tinker |
| 2,602,462 A | 7/1952 | Barrett |
| 2,811,303 A | 10/1957 | Ault et al. |
| 2,836,117 A | 5/1958 | Lankford |
| 2,868,565 A | 1/1959 | Suderow |
| 2,897,917 A | 8/1959 | Hunter |
| 2,932,360 A | 4/1960 | Hungate |
| 2,954,841 A | 10/1960 | Reistle |
| 3,044,657 A | 7/1962 | Horton |
| 3,191,364 A | 6/1965 | Sylvan |
| 3,198,214 A | 8/1965 | Lorenz |
| 3,204,696 A | 9/1965 | De Priester et al. |

(Continued)

FOREIGN PATENT DOCUMENTS

CA 2647511 10/2007

(Continued)

OTHER PUBLICATIONS

Technical Manual—High Pressure Air Compressor Model 13NL45; Naysea S6220-AT-MMA-010/93236, pp. 3-23 to 3-32, Electric Boat Corporation, Groton, CT 06340, Oct. 28, 1991.

(Continued)

*Primary Examiner* — Scott B Geyer (74) *Attorney, Agent, or Firm* — Edmonds & Nolte, PC (57) ABSTRACT

A separator is for a turbomachine, preferably a compressor including a casing, a primary compressor shaft with an impeller disposed within the casing, and a drive shaft connectable with the compressor shaft. The separator includes a coupler having a central axis and being configured to connect the drive shaft with the compressor shaft such that the rotation of the driver shaft rotates the coupler and connected compressor shaft. A separation surface extends circumferentially about the axis so as to at least partially define a flow passage for a fluid stream, the separation surface being disposed either generally within or generally about the coupler. The separation surface is connected with the coupler such that rotation of at least one of the two shafts rotates the separation surface generally about the axis so that liquid within the fluid stream contacting the separation surface is separated from the fluid stream.

21 Claims, 3 Drawing Sheets

U.S. PATENT DOCUMENTS

| | | | |
|---|---|---|---|
| 3,213,794 A | 10/1965 | Adams | |
| 3,220,245 A | 11/1965 | Van Winkle | |
| 3,273,325 A | 9/1966 | Gerhold | |
| 3,352,577 A | 11/1967 | Medney | |
| 3,395,511 A | 8/1968 | Akerman | |
| 3,402,434 A | 9/1968 | Kajimura et al. | |
| 3,431,747 A | 3/1969 | Hasheimi et al. | |
| 3,454,163 A | 7/1969 | Read | |
| 3,487,432 A | 12/1969 | Jenson | |
| 3,490,209 A | 1/1970 | Fernandes et al. | |
| 3,500,614 A | 3/1970 | Soo | |
| 3,578,342 A | 5/1971 | Welch et al. | |
| 3,628,812 A | 12/1971 | Larralde et al. | |
| 3,672,733 A | 6/1972 | Arsenius et al. | |
| 3,814,486 A | 6/1974 | Schurger | |
| 3,829,179 A | 8/1974 | Kurita et al. | |
| 3,915,673 A | 10/1975 | Tamai et al. | |
| 3,975,123 A | 8/1976 | Schibbye | |
| 4,033,647 A | 7/1977 | Beavers | |
| 4,059,364 A | 11/1977 | Andersen et al. | |
| 4,078,809 A | 3/1978 | Garrick et al. | |
| 4,087,261 A | 5/1978 | Hays | |
| 4,103,899 A | 8/1978 | Turner | |
| 4,112,687 A | 9/1978 | Dixon | |
| 4,117,359 A | 9/1978 | Wehde | |
| 4,135,542 A | 1/1979 | Chisholm | |
| 4,141,283 A | 2/1979 | Swanson et al. | |
| 4,146,261 A | 3/1979 | Edmaier et al. | |
| 4,165,622 A | 8/1979 | Brown, Jr. | |
| 4,174,925 A | 11/1979 | Pfenning et al. | |
| 4,182,480 A | 1/1980 | Theyse et al. | |
| 4,197,990 A | 4/1980 | Carberg et al. | |
| 4,205,927 A | 6/1980 | Simmons | |
| 4,227,373 A | 10/1980 | Amend et al. | |
| 4,258,551 A | 3/1981 | Ritzi | |
| 4,259,045 A | 3/1981 | Teruyama | |
| 4,278,200 A | 7/1981 | Gunnewig | |
| 4,298,311 A | 11/1981 | Ritzi | |
| 4,333,748 A | 6/1982 | Erickson | |
| 4,334,592 A | 6/1982 | Fair | |
| 4,336,693 A | 6/1982 | Hays et al. | |
| 4,339,923 A | 7/1982 | Hays et al. | |
| 4,347,900 A | 9/1982 | Barrington | |
| 4,363,608 A | 12/1982 | Mulders | |
| 4,374,583 A | 2/1983 | Barrington | |
| 4,375,975 A | 3/1983 | McNicholas | |
| 4,382,804 A | 5/1983 | Mellor | |
| 4,384,724 A | 5/1983 | Derman | |
| 4,391,102 A | 7/1983 | Studhalter et al. | |
| 4,396,361 A | 8/1983 | Fraser | |
| 4,432,470 A | 2/1984 | Sopha | |
| 4,438,638 A | 3/1984 | Hays et al. | |
| 4,441,322 A | 4/1984 | Ritzi | |
| 4,442,925 A | 4/1984 | Fukushima et al. | |
| 4,453,893 A | 6/1984 | Hutmaker | |
| 4,463,567 A | 8/1984 | Amend et al. | |
| 4,468,234 A | 8/1984 | McNicholas | |
| 4,471,795 A | 9/1984 | Linhardt | |
| 4,477,223 A | 10/1984 | Giroux | |
| 4,502,839 A | 3/1985 | Maddox et al. | |
| 4,511,309 A | 4/1985 | Maddox | |
| 4,531,888 A | 7/1985 | Buchelt | |
| 4,536,134 A | 8/1985 | Huiber | |
| 4,541,531 A | 9/1985 | Brule | |
| 4,541,607 A | 9/1985 | Hotger | |
| 4,573,527 A | 3/1986 | McDonough | |
| 4,574,815 A | 3/1986 | West et al. | |
| 4,648,806 A | 3/1987 | Alexander | |
| 4,687,017 A | 8/1987 | Danko et al. | |
| 4,737,081 A | 4/1988 | Nakajima et al. | |
| 4,752,185 A | 6/1988 | Butler et al. | |
| 4,807,664 A | 2/1989 | Wilson et al. | |
| 4,813,495 A | 3/1989 | Leach | |
| 4,821,737 A | 4/1989 | Nelson | |
| 4,826,403 A | 5/1989 | Catlow | |
| 4,830,331 A | 5/1989 | Vindum | |
| 4,832,709 A | 5/1989 | Nagyszalanczy | |
| 4,904,284 A | 2/1990 | Hanabusa | |
| 4,984,830 A | 1/1991 | Saunders | |
| 5,003,766 A * | 4/1991 | Paul | 60/39.15 |
| 5,007,328 A | 4/1991 | Otteman | |
| 5,024,585 A | 6/1991 | Kralovec | |
| 5,043,617 A | 8/1991 | Rostron | |
| 5,044,701 A | 9/1991 | Watanabe et al. | |
| 5,045,046 A | 9/1991 | Bond | |
| 5,054,995 A | 10/1991 | Kaseley et al. | |
| 5,064,452 A | 11/1991 | Yano et al. | |
| 5,080,137 A | 1/1992 | Adams | |
| 5,190,440 A | 3/1993 | Maier et al. | |
| 5,202,024 A | 4/1993 | Andersson et al. | |
| 5,202,026 A | 4/1993 | Lema | |
| 5,203,891 A | 4/1993 | Lema | |
| 5,207,810 A | 5/1993 | Sheth | |
| 5,211,427 A | 5/1993 | Washizu | |
| 5,246,346 A | 9/1993 | Schiesser | |
| 5,285,123 A | 2/1994 | Kataoka et al. | |
| 5,306,051 A | 4/1994 | Loker et al. | |
| 5,337,779 A | 8/1994 | Fukuhara | |
| 5,378,121 A | 1/1995 | Hackett | |
| 5,385,446 A | 1/1995 | Hays | |
| 5,421,708 A | 6/1995 | Utter | |
| 5,443,581 A | 8/1995 | Malone | |
| 5,484,521 A | 1/1996 | Kramer | |
| 5,496,394 A | 3/1996 | Nied | |
| 5,500,039 A | 3/1996 | Mori et al. | |
| 5,525,034 A | 6/1996 | Hays | |
| 5,525,146 A | 6/1996 | Straub | |
| 5,531,811 A | 7/1996 | Kloberdanz | |
| 5,538,259 A | 7/1996 | Uhrner et al. | |
| 5,542,831 A | 8/1996 | Scarfone | |
| 5,575,309 A | 11/1996 | Connell | |
| 5,585,000 A | 12/1996 | Sassi | |
| 5,605,172 A | 2/1997 | Schubert et al. | |
| 5,628,623 A | 5/1997 | Skaggs | |
| 5,634,492 A | 6/1997 | Steinruck et al. | |
| 5,640,472 A | 6/1997 | Meinzer et al. | |
| 5,641,280 A | 6/1997 | Timuska | |
| 5,653,347 A | 8/1997 | Larsson | |
| 5,664,420 A | 9/1997 | Hays | |
| 5,682,759 A | 11/1997 | Hays | |
| 5,683,235 A | 11/1997 | Welch | |
| 5,685,691 A | 11/1997 | Hays | |
| 5,687,249 A | 11/1997 | Kato | |
| 5,693,125 A | 12/1997 | Dean | |
| 5,703,424 A | 12/1997 | Dorman | |
| 5,709,528 A | 1/1998 | Hablanian | |
| 5,713,720 A | 2/1998 | Barhoum | |
| 5,720,799 A | 2/1998 | Hays | |
| 5,750,040 A | 5/1998 | Hays | |
| 5,775,882 A | 7/1998 | Kiyokawa et al. | |
| 5,779,619 A | 7/1998 | Borgstrom et al. | |
| 5,795,135 A | 8/1998 | Nyilas et al. | |
| 5,800,092 A | 9/1998 | Nill et al. | |
| 5,848,616 A | 12/1998 | Vogel et al. | |
| 5,850,857 A | 12/1998 | Simpson | |
| 5,853,585 A | 12/1998 | Nesseth | |
| 5,863,023 A | 1/1999 | Evans et al. | |
| 5,899,435 A | 5/1999 | Mitsch et al. | |
| 5,935,053 A | 8/1999 | Strid et al. | |
| 5,938,803 A | 8/1999 | Dries | |
| 5,938,819 A | 8/1999 | Seery | |
| 5,946,915 A | 9/1999 | Hays | |
| 5,951,066 A | 9/1999 | Lane et al. | |
| 5,965,022 A | 10/1999 | Gould | |
| 5,967,746 A | 10/1999 | Hagi et al. | |
| 5,971,702 A | 10/1999 | Afton et al. | |
| 5,971,907 A | 10/1999 | Johannemann et al. | |
| 5,980,218 A | 11/1999 | Takahashi et al. | |
| 5,988,524 A | 11/1999 | Odajima et al. | |
| 6,035,934 A | 3/2000 | Stevenson et al. | |
| 6,059,539 A | 5/2000 | Nyilas et al. | |
| 6,068,447 A | 5/2000 | Foege | |
| 6,090,174 A | 7/2000 | Douma et al. | |
| 6,090,299 A | 7/2000 | Hays et al. | |
| 6,113,675 A | 9/2000 | Branstetter | |
| 6,122,915 A | 9/2000 | Hays | |
| 6,123,363 A | 9/2000 | Burgard et al. | |

| Patent No. | Date | Name |
|---|---|---|
| 6,145,844 A | 11/2000 | Waggott |
| 6,149,825 A | 11/2000 | Gargas |
| 6,151,881 A | 11/2000 | Ai et al. |
| 6,190,123 B1 * | 2/2001 | Wunderwald et al. ...... 415/168.1 |
| 6,196,962 B1 | 3/2001 | Purvey et al. |
| 6,206,202 B1 | 3/2001 | Galk et al. |
| 6,214,075 B1 | 4/2001 | Filges et al. |
| 6,217,637 B1 | 4/2001 | Toney et al. |
| 6,227,379 B1 | 5/2001 | Nesseth |
| 6,273,674 B1 * | 8/2001 | Charron .................... 415/169.3 |
| 6,277,278 B1 | 8/2001 | Conrad et al. |
| 6,312,021 B1 | 11/2001 | Thomas |
| 6,314,738 B1 | 11/2001 | Hays |
| 6,372,006 B1 | 4/2002 | Pregenzer et al. |
| 6,375,437 B1 | 4/2002 | Nolan |
| 6,383,262 B1 | 5/2002 | Marthinsen et al. |
| 6,394,764 B1 | 5/2002 | Samurin |
| 6,398,973 B1 | 6/2002 | Saunders et al. |
| 6,402,465 B1 | 6/2002 | Maier |
| 6,426,010 B1 | 7/2002 | Lecoffre et al. |
| 6,464,469 B1 | 10/2002 | Grob et al. |
| 6,467,988 B1 | 10/2002 | Czachor et al. |
| 6,468,426 B1 | 10/2002 | Klass |
| 6,485,536 B1 | 11/2002 | Masters |
| 6,530,484 B1 | 3/2003 | Bosman |
| 6,530,979 B2 | 3/2003 | Firey |
| 6,531,066 B1 | 3/2003 | Saunders et al. |
| 6,537,035 B2 | 3/2003 | Shumway |
| 6,540,917 B1 | 4/2003 | Rachels et al. |
| 6,547,037 B2 | 4/2003 | Kuzdzal |
| 6,592,654 B2 | 7/2003 | Brown |
| 6,596,046 B2 | 7/2003 | Conrad et al. |
| 6,599,086 B2 | 7/2003 | Soja |
| 6,607,348 B2 | 8/2003 | Jean |
| 6,616,719 B1 | 9/2003 | Sun et al. |
| 6,617,731 B1 | 9/2003 | Goodnick et al. |
| 6,629,825 B2 | 10/2003 | Stickland et al. |
| 6,631,617 B1 | 10/2003 | Dreiman et al. |
| 6,658,986 B2 | 12/2003 | Pitla et al. |
| 6,659,143 B1 | 12/2003 | Taylor et al. |
| 6,669,845 B2 | 12/2003 | Klass |
| 6,688,802 B2 | 2/2004 | Ross et al. |
| 6,707,200 B2 | 3/2004 | Carroll et al. |
| 6,718,955 B1 | 4/2004 | Knight |
| 6,719,830 B2 | 4/2004 | Illingworth et al. |
| 6,764,284 B2 | 7/2004 | Oehman, Jr. |
| 6,776,812 B2 | 8/2004 | Komura et al. |
| 6,802,693 B2 | 10/2004 | Reinfeld et al. |
| 6,802,881 B2 | 10/2004 | Illingworth et al. |
| 6,811,713 B2 | 11/2004 | Arnaud |
| 6,817,846 B2 | 11/2004 | Bennitt |
| 6,837,913 B2 | 1/2005 | Schilling et al. |
| 6,843,836 B2 | 1/2005 | Kitchener |
| 6,878,187 B1 | 4/2005 | Hays et al. |
| 6,893,208 B2 | 5/2005 | Frosini et al. |
| 6,907,933 B2 | 6/2005 | Choi et al. |
| 6,979,358 B2 | 12/2005 | Ekker |
| 7,001,448 B1 | 2/2006 | West |
| 7,013,978 B2 | 3/2006 | Appleford et al. |
| 7,022,150 B2 | 4/2006 | Borgstrom et al. |
| 7,022,153 B2 | 4/2006 | McKenzie |
| 7,025,890 B2 | 4/2006 | Moya |
| 7,033,410 B2 | 4/2006 | Hilpert et al. |
| 7,033,411 B2 | 4/2006 | Carlsson et al. |
| 7,056,363 B2 | 6/2006 | Carlsson et al. |
| 7,063,465 B1 | 6/2006 | Wilkes et al. |
| 7,112,036 B2 | 9/2006 | Lubell et al. |
| 7,131,292 B2 | 11/2006 | Ikegami et al. |
| 7,144,226 B2 | 12/2006 | Pugnet et al. |
| 7,159,723 B2 | 1/2007 | Hilpert et al. |
| 7,160,518 B2 | 1/2007 | Chen et al. |
| 7,169,305 B2 | 1/2007 | Gomez |
| 7,185,447 B2 | 3/2007 | Arbeiter |
| 7,204,241 B2 | 4/2007 | Thompson et al. |
| 7,241,392 B2 | 7/2007 | Maier |
| 7,244,111 B2 | 7/2007 | Suter et al. |
| 7,258,713 B2 | 8/2007 | Eubank et al. |
| 7,270,145 B2 | 9/2007 | Koezler |
| 7,288,202 B2 | 10/2007 | Maier |
| 7,314,560 B2 | 1/2008 | Yoshida et al. |
| 7,323,023 B2 | 1/2008 | Michele et al. |
| 7,328,749 B2 | 2/2008 | Reitz |
| 7,335,313 B2 | 2/2008 | Moya |
| 7,337,110 B2 | 2/2008 | Jasiuk |
| 7,381,235 B2 | 6/2008 | Koene et al. |
| 7,396,373 B2 | 7/2008 | Lagerstedt et al. |
| 7,399,412 B2 | 7/2008 | Keuschnigg |
| 7,435,290 B2 | 10/2008 | Lane et al. |
| 7,445,653 B2 | 11/2008 | Trautmann et al. |
| 7,470,299 B2 | 12/2008 | Han et al. |
| 7,473,083 B2 | 1/2009 | Oh et al. |
| 7,479,171 B2 | 1/2009 | Cho et al. |
| 7,494,523 B2 | 2/2009 | Oh et al. |
| 7,501,002 B2 | 3/2009 | Han et al. |
| 7,520,210 B2 | 4/2009 | Theodore, Jr. et al. |
| 7,575,422 B2 | 8/2009 | Bode et al. |
| 7,578,863 B2 | 8/2009 | Becker et al. |
| 7,591,882 B2 | 9/2009 | Harazim |
| 7,594,941 B2 | 9/2009 | Zheng et al. |
| 7,594,942 B2 | 9/2009 | Polderman |
| 7,610,955 B2 | 11/2009 | Irwin, Jr. |
| 7,628,836 B2 | 12/2009 | Baronet et al. |
| 7,637,699 B2 | 12/2009 | Albrecht |
| 7,674,377 B2 | 3/2010 | Carew |
| 7,677,308 B2 | 3/2010 | Kolle |
| 7,708,537 B2 | 5/2010 | Bhatia et al. |
| 7,708,808 B1 | 5/2010 | Heumann |
| 7,744,663 B2 | 6/2010 | Wallace |
| 7,748,079 B2 | 7/2010 | McDowell et al. |
| 7,766,989 B2 | 8/2010 | Lane et al. |
| 7,811,344 B1 | 10/2010 | Duke et al. |
| 7,811,347 B2 | 10/2010 | Carlsson et al. |
| 7,815,415 B2 | 10/2010 | Kanezawa et al. |
| 7,824,458 B2 | 11/2010 | Borgstrom et al. |
| 7,824,459 B2 | 11/2010 | Borgstrom et al. |
| 7,846,228 B1 | 12/2010 | Saaski et al. |
| 2001/0007283 A1 | 7/2001 | Johal et al. |
| 2002/0009361 A1 | 1/2002 | Reichert et al. |
| 2003/0029318 A1 | 2/2003 | Firey |
| 2003/0035718 A1 | 2/2003 | Langston et al. |
| 2003/0136094 A1 | 7/2003 | Illingworth et al. |
| 2004/0007261 A1 | 1/2004 | Cornwell |
| 2004/0170505 A1 | 9/2004 | Lenderink et al. |
| 2005/0173337 A1 | 8/2005 | Costinel |
| 2006/0065609 A1 | 3/2006 | Arthur |
| 2006/0090430 A1 | 5/2006 | Trautman et al. |
| 2006/0096933 A1 | 5/2006 | Maier |
| 2006/0157251 A1 | 7/2006 | Stinessen et al. |
| 2006/0157406 A1 | 7/2006 | Maier |
| 2006/0193728 A1 | 8/2006 | Lindsey et al. |
| 2006/0222515 A1 | 10/2006 | Delmotte et al. |
| 2006/0230933 A1 | 10/2006 | Harazim |
| 2006/0239831 A1 | 10/2006 | Garris, Jr. |
| 2006/0254659 A1 | 11/2006 | Bellott et al. |
| 2006/0275160 A1 | 12/2006 | Leu et al. |
| 2007/0029091 A1 | 2/2007 | Stinessen et al. |
| 2007/0036646 A1 | 2/2007 | Nguyen et al. |
| 2007/0051245 A1 | 3/2007 | Yun |
| 2007/0062374 A1 | 3/2007 | Kolle |
| 2007/0065317 A1 | 3/2007 | Stock |
| 2007/0084340 A1 | 4/2007 | Dou et al. |
| 2007/0140870 A1 | 6/2007 | Fukanuma et al. |
| 2007/0151922 A1 | 7/2007 | Mian |
| 2007/0163215 A1 | 7/2007 | Lagerstedt |
| 2007/0172363 A1 | 7/2007 | Laboube et al. |
| 2007/0196215 A1 | 8/2007 | Frosini et al. |
| 2007/0227969 A1 | 10/2007 | Dehaene et al. |
| 2007/0294986 A1 | 12/2007 | Beetz et al. |
| 2008/0031732 A1 | 2/2008 | Peer et al. |
| 2008/0039732 A9 | 2/2008 | Bowman |
| 2008/0246281 A1 | 10/2008 | Agrawal et al. |
| 2008/0315812 A1 | 12/2008 | Balboul |
| 2009/0013658 A1 | 1/2009 | Borgstrom et al. |
| 2009/0015012 A1 | 1/2009 | Metzler et al. |
| 2009/0025562 A1 | 1/2009 | Hallgren et al. |
| 2009/0025563 A1 | 1/2009 | Borgstrom et al. |
| 2009/0151928 A1 | 6/2009 | Lawson |
| 2009/0159523 A1 | 6/2009 | McCutchen |

| | | | |
|---|---|---|---|
| 2009/0169407 | A1 | 7/2009 | Yun |
| 2009/0173095 | A1 | 7/2009 | Bhatia et al. |
| 2009/0266231 | A1 | 10/2009 | Franzen et al. |
| 2009/0304496 | A1 | 12/2009 | Maier |
| 2009/0321343 | A1 | 12/2009 | Maier |
| 2009/0324391 | A1 | 12/2009 | Maier |
| 2010/0007133 | A1 | 1/2010 | Maier |
| 2010/0021292 | A1 | 1/2010 | Maier et al. |
| 2010/0038309 | A1* | 2/2010 | Maier .................. 210/512.3 |
| 2010/0043288 | A1 | 2/2010 | Wallace |
| 2010/0043364 | A1 | 2/2010 | Curien |
| 2010/0044966 | A1 | 2/2010 | Majot et al. |
| 2010/0072121 | A1 | 3/2010 | Maier |
| 2010/0074768 | A1 | 3/2010 | Maier |
| 2010/0083690 | A1 | 4/2010 | Sato et al. |
| 2010/0090087 | A1 | 4/2010 | Maier |
| 2010/0143172 | A1 | 6/2010 | Sato et al. |
| 2010/0163232 | A1 | 7/2010 | Kolle |
| 2010/0183438 | A1 | 7/2010 | Maier et al. |
| 2010/0239419 | A1 | 9/2010 | Maier et al. |
| 2010/0239437 | A1 | 9/2010 | Maier |
| 2010/0247299 | A1 | 9/2010 | Maier |
| 2010/0257827 | A1 | 10/2010 | Lane et al. |
| 2011/0017307 | A1 | 1/2011 | Kidd et al. |
| 2011/0061536 | A1 | 3/2011 | Maier et al. |

FOREIGN PATENT DOCUMENTS

| | | |
|---|---|---|
| EP | 301285 | 10/1991 |
| EP | 1582703 | 10/2005 |
| EP | 2013479 | 1/2009 |
| GB | 2323639 | 9/1998 |
| GB | 2337561 | 11/1999 |
| JP | 54099206 | 1/1978 |
| JP | 08 068501 | 3/1996 |
| JP | 8-284961 A | 11/1996 |
| JP | 2002 242699 | 8/2002 |
| JP | 3711028 | 8/2002 |
| JP | 2005291202 | 10/2005 |
| KR | 2009085521 | 2/2008 |
| MX | 2008012579 | 12/2008 |
| WO | 9524563 | 9/1995 |
| WO | 0117096 | 3/2001 |
| WO | 2007043889 | 4/2007 |
| WO | 2007103248 | 9/2007 |
| WO | 2007120506 | 10/2007 |
| WO | 2008036221 | 3/2008 |
| WO | 2008039446 | 3/2008 |
| WO | 2008039491 | 4/2008 |
| WO | 2008039731 | 4/2008 |
| WO | 2008039732 | 4/2008 |
| WO | 2008039733 | 4/2008 |
| WO | 2008039734 | 4/2008 |
| WO | 2008036394 | 7/2008 |
| WO | 2009111616 | 9/2009 |
| WO | 2009158252 | 12/2009 |
| WO | 2009158253 | 12/2009 |
| WO | 2010083416 | 7/2010 |
| WO | 2010083427 | 7/2010 |
| WO | 2010107579 | 9/2010 |
| WO | 2010110992 | 9/2010 |
| WO | 2011034764 | 3/2011 |

OTHER PUBLICATIONS

PCT/US2007/008149 International Preliminary Report on Patentability dated Sep. 30, 2008.
PCT/US2007/008149 International Search Report and Written Opinion dated Jul. 17, 2008.
PCT/US2007/020101 International Preliminary Report on Patentability dated Apr. 2, 2009.
PCT/US2007/020101 International Search Report dated Apr. 29, 2008.
PCT/US2007/020101 Written Opinion dated Mar. 19, 2009.
PCT/US2007/020471 International Preliminary Report on Patentability dated Apr. 2, 2009.
PCT/US2007/020471 International Search Report and Written Opinion dated Apr. 1, 2008.
PCT/US2007/020659 International Preliminary Report on Patentability dated Mar. 31, 2009.
PCT/US2007/020659 International Search Report and Written Opinion dated Sep. 17, 2008.
PCT/US2007/020768 International Preliminary Report on Patentability dated Mar. 31, 2009.
PCT/US2007/020768 International Search Report and Written Opinion dated Mar. 3, 2008.
PCT/US2007/079348 International Preliminary Report on Patentability dated Mar. 31, 2009.
PCT/US2007/079348 International Search Report dated Apr. 11, 2008.
PCT/US2007/079348 Written Opinion dated Jan. 25, 2008.
PCT/US2007/079349 International Preliminary Report on Patentability dated Mar. 31, 2009.
PCT/US2007/079349 International Search Report and Written Opinion dated Apr. 2, 2008.
PCT/US2007/079350 International Preliminary Report on Patentability dated Mar. 31, 2009.
PCT/US2007/079350 International Search Report dated Jul. 17, 2008.
PCT/US2007/079350 Written Opinion dated Mar. 25, 2009.
PCT/US2007/079352 International Preliminary Report on Patentability dated Mar. 31, 2009.
PCT/US2007/079352 International Search Report and Written Opinion dated Aug. 27, 2008.
PCT/US2009/036142 International Preliminary Report on Patentability dated Sep. 16, 2010.
PCT/US2009/036142 International Search Report dated Jan. 7, 2010.
PCT/US2009/036142 Written Opinion dated May 11, 2009.
PCT/US2009/047662 International Preliminary Report on Patentability dated Jan. 13, 2011.
PCT/US2009/047662 Written Opinion dated Aug. 20, 2009.
PCT/US2010/021199 International Search Report and Written Opinion dated Mar. 22, 2010.
PCT/US2010/021199 International Preliminary Report on Patentability dated Mar. 29, 2011.
PCT/US2010/021218 International Search Report and Written Opinion dated Mar. 23, 2010.
PCT/US2010/021218 International Report on Patentability dated Feb. 2, 2011.
PCT/US2010/025650 International Search Report and Written Opinion dated Apr. 22, 2010.
PCT/US2010/025650 International Report on Patentability dated Mar. 14, 2011.
PCT/US2010/025952 International Search Report and Written Opinion dated Apr. 12, 2010.
PCT/US2010/025952 International Report on Patentability dated Mar. 14, 2011.
PCT/US2009/047667 International Report on Patentability dated Jan. 13, 2011.
PCT/US2009/047667 Written Opinion dated Aug. 7, 2009.
PCT/US2009/047667 International Search Report dated Dec. 30, 2009.
Technical Manual—High Pressure Air Compressor Model 13NL45; Navsea S6220-AT-MMA-010/93236, pp. 3-23 to 3-32, Electric Boat Corporation, Groton, CT 06340, Oct. 28, 1991.

* cited by examiner

ROTARY SEPARATOR AND SHAFT COUPLER FOR COMPRESSORS

The present invention relates to fluid machinery, and more particularly to separators for such fluid machinery.

Rotary separators for separating solids from fluids, liquids from gases, or/and gases or liquids of varying density are known. Such rotary separators typically include a rotatable tubular body having a central bore with inlet and outlet ends. With this structure, fluid flow enters the inlet end and passes through the bore, such that heavier fluids (e.g., liquids) are directed outwardly onto an inner surface of the tubular body, and generally pass through openings therethrough for collection, while the lighter fluids (e.g., gas) pass through an outlet end of the body. Typically, fluid flow out of the body outlet is directed into one or more passages, such as an inlet of a compressor or an outlet pipe of a "stand alone" separator device.

Generally, to include a rotary separator into a compressor assembly, a certain amount of space is required within the compressor casing. As such, various components of the compressor, such as the casing, compressor shaft or drive shaft, etc., must be enlarged or elongated provide such space for the separator.

SUMMARY OF THE INVENTION

In one aspect, the present invention is a separator for a compressor including a casing, a primary compressor shaft disposed within the casing, at least one impeller mounted to the compressor shaft, and a drive shaft connectable with the compressor shaft. The separator comprises a coupler having a central axis and being configured to connect the drive shaft with the compressor shaft such that the rotation of the driver shaft rotates the coupler and connected compressor shaft. A separation surface extends circumferentially about the axis so as to at least partially define a flow passage for a fluid stream. The separation surface is disposed either generally within and or generally about the coupler and is connected with the coupler. As such, rotation of at least one of the two shafts rotates the separation surface generally about the axis so that liquid within the fluid stream contacting the separation surface is separated from the fluid stream.

In another aspect, the present invention is a compressor assembly comprising a casing including an interior chamber, a driver including a shaft, the shaft extending into the interior chamber. At least one impeller is mounted on a compressor shaft, the compressor shaft being disposed in the casing interior chamber. A separator includes a coupler, the coupler having a central axis and being configured to connect the drive shaft with the compressor shaft such that the rotation of the driver shaft rotates the coupler and connected compressor shaft. Further, a separation surface extends circumferentially about the axis so as to at least partially define a flow passage for a fluid stream. The separation surface is disposed either generally within or generally about the coupler and is connected with the coupler. As such, rotation of at least one of the two shafts rotates the separation surface generally about the axis so that liquid within the fluid stream contacting the separation surface is separated from the fluid stream.

In a further aspect, the present invention is again a separator for a compressor including a casing, a primary compressor shaft disposed within the casing, at least one impeller mounted to the compressor shaft, and a drive shaft connectable with the compressor shaft. The separator comprises a coupler including an inner tubular body having a central axis and being configured to connect the drive shaft with the compressor shaft such that the rotation of the driver shaft rotates the coupler and connected compressor shaft. An outer tubular body is disposed about the inner tubular body such that a flow passage is defined between the bodies, the outer body having an inner circumferential separation surface extending about the axis. As such, rotation of at least one of the two shafts rotates the separation surface generally about the axis so that liquid within the fluid stream contacting the separation surface is separated from the fluid stream.

In yet another aspect, the present invention is a separator for a turbomachine including a casing, a working shaft disposed within the casing, at least one fluid handling component mounted on the working shaft, and a drive shaft connectable with the working shaft. The separator comprises a coupler having a central axis and being configured to connect the drive shaft with the working shaft, such that the rotation of the driver shaft rotates the coupler and connected working shaft. A separation surface extends circumferentially about the axis so as to at least partially define a flow passage for a fluid stream, the separation surface being disposed generally within or generally about the coupler and connected with the coupler such that rotation of at least one of the two shafts rotates the separation surface generally about the axis. As such, liquid within the fluid stream contacting the separation surface is separated from the fluid stream.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. The words "right", left", "lower", "upper", "upward", "down" and "downward" designate directions in the drawings to which reference is made. The words "inner", "inwardly" and "outer", "outwardly" refer to directions toward and away from, respectively, a designated centerline or a geometric center of an element being described, the particular meaning being readily apparent from the context of the description. Further, as used herein, the word "connected" is intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-5 a separator 10 for a turbomachine T with one or more fluid handling components H mounted on a working shaft W. Preferably, the turbomachine T is a compressor assembly or compressor 1 including a casing 2 with an interior chamber $C_C$, a compressor shaft 3 disposed within the casing 2 and providing the working shaft W, a compression assembly 4 with at least one impeller 5 mounted to the compressor shaft 3 and providing the fluid handling component(s) H, and a driver (not shown) with a drive shaft 6 extending into the casing chamber $C_C$ and connectable with the compressor shaft 3. The separator 10 basically comprises a coupler 12 for connecting the compressor and drive shafts 3, 6 and a separation surface 14 connected with or disposed on the coupler 12, the coupler 12 and separation surface 14 forming a rotary separator 11. The coupler 12 has a central axis 13 and is configured to connect the drive shaft 6 with the compressor shaft 3 such that the rotation of the drive shaft 6 rotates the coupler 12 and connected compressor shaft 3. The separation surface 14 extends circumferentially about the axis 13 so as to at least partially define a flow passage 16 for a fluid stream FS, and is disposed either generally within or generally about the coupler 12. The separation surface 14 is connected with/disposed on the coupler 12 such that rotation of at least one of the two-shafts 3, 6 rotates the separation surface 14 generally about the axis 13 so that liquid within the fluid stream contacting the separation surface 14 is separated from the fluid stream FS.

Preferably, the coupler 12 includes an inner tubular body 20 configured to connect the compressor shaft 3 with the drive shaft 6 and having an outer circumferential surface 21 and the separator 10 further comprises an outer tubular body 22. The outer tubular body 22 is disposed about the inner tubular body 20 such that the flow passage 16 is defined between the two tubular bodies 20, 22. More specifically, the outer tubular body 22 has an inner circumferential surface 23 providing the separation surface 14 and an opposing outer circumferential surface 25, the flow passage 16 being defined between the inner tubular body outer surface 21 and the outer tubular body inner surface 23, and is thus generally annular. Further, the separator 10 preferably also comprises a plurality of generally radially-extending connectors 24 extending between and connecting the inner and outer tubular bodies 20, 22, which are each preferably formed as a generally thin, rectangular tab or vane 27 generally aligned with the coupler axis 13 so as to minimize interference with flow of the fluid stream through the passage 16.

Still referring to FIGS. 1-5, each tubular body 20, 22 has first and second ends 20a, 22a and 20b, 22b, respectively, the first ends 20a, 20b of two tubular bodies 20, 22 defining a generally annular inlet 16a of the flow passage 16 and the second ends 20b, 22b of the bodies 20, 22 defining a generally annular outlet 16b of the flow passage 16. The second end 20b of the inner tubular body 20 is connectable or connected with an end 3a of the compressor shaft 3 and the first end 20a of the inner body 20 is connectable/connected with an end 6a of the drive shaft 6, such that the inner body 20 is configured to couple the two shafts 3, 6 (i.e., provides the coupler 12). However, the outer body 22 may alternatively be configured to provide the coupler 12, and thus be connectable/connected with the two shafts 3, 6. Further, each end 20a, 20b of the inner body 20 is preferably configured to attach to a coupling hub 7 mounted on the end 3a, 6a of each shaft 3, 6, most preferably by a plurality of threaded fasteners 8 (e.g., bolts or screws), so as to releasably connect the two shafts 3, 6. Alternatively, the body ends 20a, 20b may be connected with the hubs 7 by any other appropriate means (e.g., locking rings, keys, etc.) or may be directly connected with the shaft ends 3a, 6a.

Figure 4:
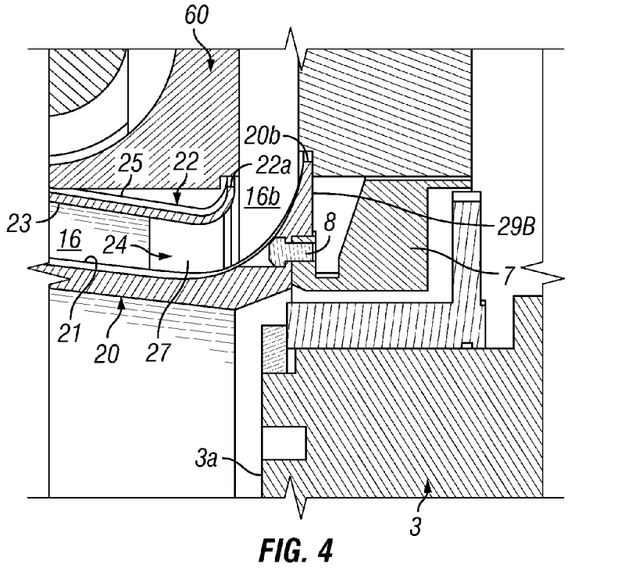
FIG. 4 is an enlarged view of another portion of FIG. 2, showing one end of the separator connected with a shaft.

Preferably, the first end 22a of the outer tubular body 22 is spaced axially inwardly with respect to the first end 20a of the inner tubular body 22 and the second end 22b of the outer tubular body 20 is spaced axially inwardly with respect to the second end 20b of the inner tubular body 20. Further, each of the first and second ends 20a, 20b of the inner tubular body 20 extend radially outwardly with respect to a remainder of the inner body 20, and are most preferably connected with the remainder or major portion of the tubular body 20 by integral, generally concave curved sections 29A, 29B, as best shown in FIG. 4. With this structure, the inlet and outlet 16a, 16b each extend at least partially radially, such that the fluid stream FS flows radially inwardly at the inlet 16a, is directed to flow generally axially through the flow passage 16, and is then directed to flow generally radially outwardly at the outlet 16b.

Figure 5:
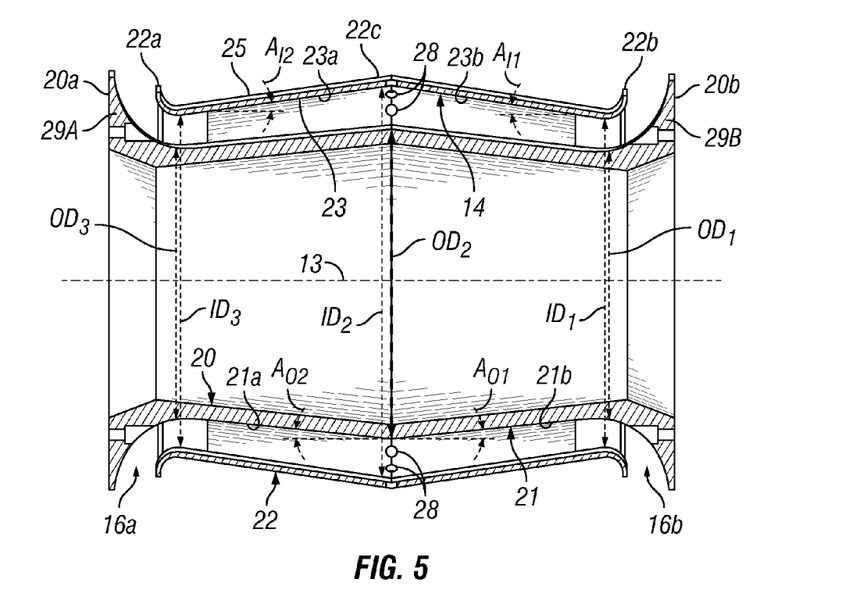
FIG. 5 is an axial cross-sectional view of a rotary separator portion of the separator.

Referring specifically to FIG. 5, the outer tubular body 22 is preferably formed such that at least the second end 22b of the outer body 22 has a first inside diameter $ID_1$ and a central portion 22c of the outer body 22 has a second diameter $ID_2$, the second diameter $ID_2$ being greater than the first diameter $ID_1$ and the inside diameter $ID_N$ varying generally linearly along the axis 13 between the second end 22b and central portion 22c. As such, at least an outlet section 14b of the separation surface 14 adjacent to the outlet 16b is generally angled, i.e., defining an angle $A_{f1}$ with respect to the axis 13, so as to direct liquids axially and radially outwardly toward the body central portion 22c. In other words, centrifugal forces generated by the rotating body 22 act on liquids disposed on the separation surface 14 such that the liquids are biased or "forced" radially outwardly, and thus flow toward the radially-outermost central portion 22c. Preferably, the first end 22a of the outer body 22 has a third inside diameter $ID_3$ sized lesser than the second diameter $ID_2$, and preferably generally equal to the first diameter $ID_1$, with the body inside diameter $ID_N$ varying generally linearly between the first end 22a and the central portion 22c, such that an inlet section 14a of the separation surface 14 adjacent to the outlet 16b is also generally angled, i.e., defining an angle $A_{f2}$ with respect to the axis 13, to direct liquids toward the central portion 22c.

Further, the outer tubular body 22 also preferably includes at least one and most preferably a plurality of outlet ports 28 extending generally radially between the body inner and outer surfaces 23, 25 and spaced circumferentially about the coupler axis 13. Each outlet port 28 is configured to discharge liquids from the flow passage 16, and preferably to direct the liquids at least generally toward a static separation surface 44, as described below. Furthermore, the outer tubular body 22 may further include a generally annular, central collection groove (not depicted) extending circumferentially about the coupler axis 13 and radially outwardly from the body inner surface 23, with each outlet port 28 being fluidly connected with the groove. As such, liquids on the body inner surface 23 are first directed to flow toward and into the collection groove (i.e., by centrifugal force and the angle of the surface 14), and thereafter through one or more outlet ports 28.

Still referring particularly to FIG. 5, the inner tubular body 20 is preferably formed such that the body outer surface 21 is configured to direct liquids contacting the surface 21 generally toward the separation surface 14, most preferably at least generally towards the outer body central portion 22c. Preferably, at least an outlet section 21a of the outer surface 21 is generally angled so as to direct fluids generally axially away from the outlet 16b and radially outwardly toward a central portion 20c of the body 20, and thereafter to the separation surface 14. Specifically, the body outer surface 21 preferably extends from a first outside diameter $OD_1$ proximal to the body outlet end 20b (i.e., inward of the outer curved section 29B) to a second outside diameter $OD_2$ at the central portion 20c, with the second diameter $OD_2$ being greater than the first diameter $OD_1$ and the outside diameter $OD_N$ varying generally linearly along the axis 13 between the second end 20b and the central portion 20c. As such, the outlet section 21b defines an angle $A_{O1}$ with respect to the axis 13. Further, the inner body outer surface 21 is also preferably formed with an angled inlet section 21a. Specifically, the outer surface 21 has a third outside diameter $OD_3$ proximal to the inlet end 20a (i.e., inward of the inner curved section 29A) sized lesser than the second diameter $OD_2$, and preferably generally equal to the first outside $OD_1$, with the body outside diameter $OD_N$ varying generally linearly between the first end 20a and the central portion 20c. As such, the inlet section 20a of the outer surface 21 defines an angle $A_{O2}$ with respect to the axis 13, so to direct liquids axially and radially outwardly toward the central portion 20c.

Figure 1:
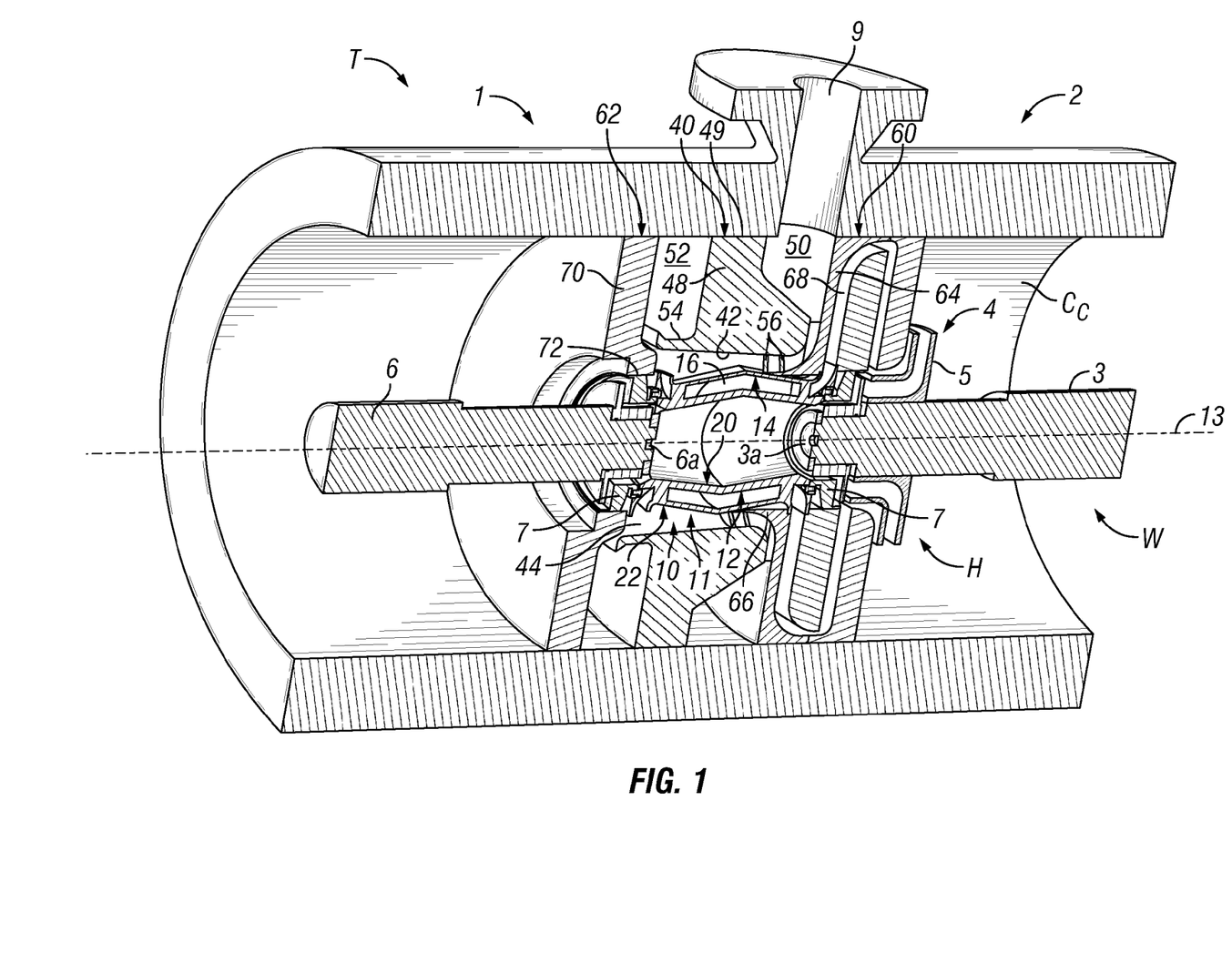
FIG. 1 is a partly broken away, perspective view of an axial cross-section through a compressor assembly including a separator in accordance with the present invention.
Figure 2:
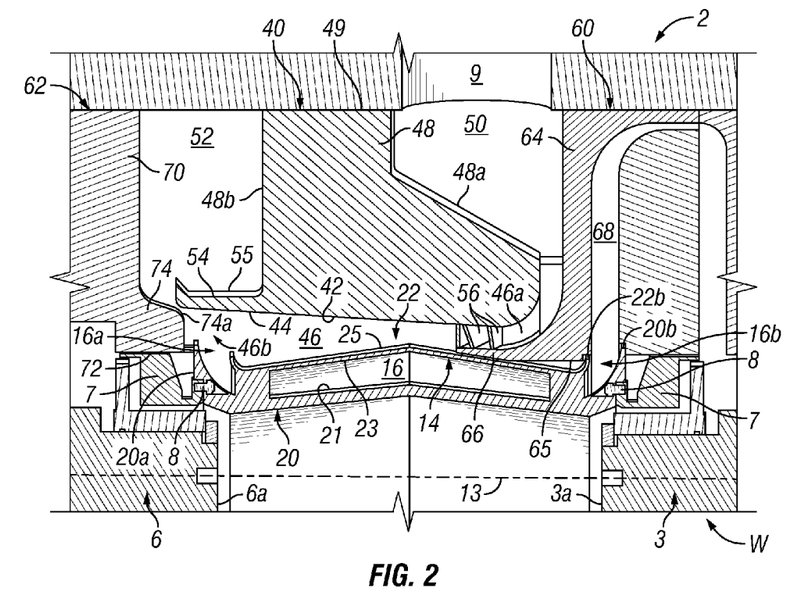
FIG. 2 is a broken-away, axial cross-sectional view of the compressor and the separator.
Figure 3:
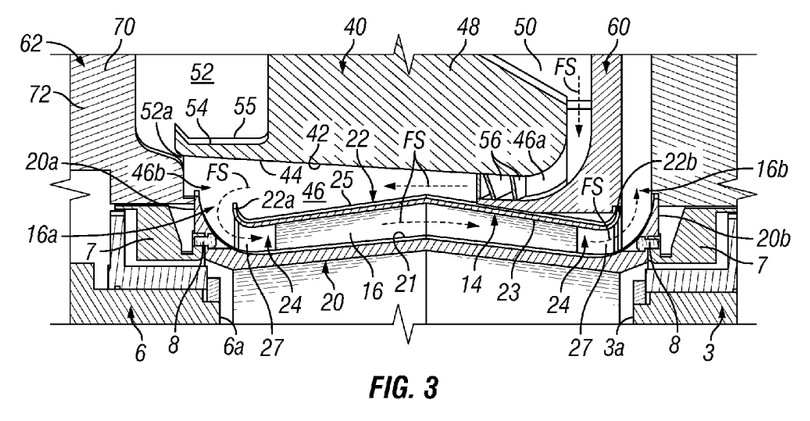
FIG. 3 is an enlarged view of a portion of FIG. 2, indicating the fluid flow through the separator.

Referring now to FIGS. 1-3, the separator 10 preferably further comprises a static member 40 disposed about the coupler 12 and having a central bore 42. The static separator bore 42 has an inner circumferential separation surface 44 spaced radially outwardly from the coupler 12, such that a static separation passage 46 is defined between the static member 44 and the coupler 12. The static separation surface 46 is configured such that liquid in a fluid stream contacting the surface 46 is separated from the stream. Further, the separation surface 44 is configured to collect liquid from the rotary separator 11, directed either from the body outer surface 23 or discharged from the outlet ports 28, for subsequent removal through a liquid outlet or "drain" (not shown). Preferably, the static member 40 includes a generally cylindrical body 48 connected with the casing 2, the body 48 having an inner circumferential surface providing the static separation surface 44 and an outer circumferential surface 49 disposed against the casing inner surface 2a. The body 48 also has opposing, generally radial end surfaces 48a, 48b, one end surface 48a partially defining an inlet passage 50 and the other end surface 48b partially defining a liquid collection chamber 52, as discussed below. Furthermore, the body 40 also preferably includes an annular portion 54 extending axially from the body end surface 48b and having an outer circumferential surface 55 spaced radially inwardly with respect to the outer surface 49, and thus the casing inner surface 2a, which also partially defines the collection chamber 52, as described below.

Preferably, the separator 10 also further comprises a plurality of swirler blades 56 disposed at least partially within the static separation passage 46 and spaced circumferentially about the axis 13. Each blade 56 is configured to direct fluid contacting the blade 56 generally circumferentially with respect to the axis 13, so as to "swirl" the fluid to flow partly radially to increase separation efficiency. The blades 56 are preferably connected with or provided on a chamber wall member 60 as described below, but may alternatively be connected with or provided by the static member 40. Further, the blades 56 are preferably located at the inlet 46a of the static separation passage 46, so as to swirl the fluid as the fluid enters the static passage 46, but may alternatively be located centrally in the passage 46 or at the passage outlet 46b, so as to swirl fluid flow immediately prior to the fluid entering the rotary separator 11.

Still referring to FIGS. 1-3, the separator 10 preferably further includes two chamber walls 60, 62 each disposed generally about a separate end 3a, 6a of the shafts 3, 6 and spaced axially from the static separator body 40. Specifically, a first chamber wall 60 is disposed about the compressor shaft 3 and is spaced axially from the static separator body end surface 48a so as to define the inlet passage 50, which is fluidly coupled with a fluid inlet 9 extending through the casing 2, and separates or "isolates" the separator 10 from the compression assembly 4. The first chamber wall 60 preferably includes a generally disk-like body 64 with a central bore 65 and an annular portion 66 extending axially from a first end 64a, the swirler blades 54 being connected with the annular portion 66. Further, the bore 65 is sized to receive a portion of the rotary separator 11, such that the outlet end 22b of the outer tubular member 22 seals against the bore 54. Additionally, the first chamber wall 60 preferably also partially defines a diffuser or deswirler passage 68, which is fluidly coupled with the separator flow passage outlet 16b.

Furthermore, a second chamber wall 62 is disposed about the driver shaft 6 and is spaced axially from the static separator body end surface 48b so as to define the collection chamber 52, which is fluidly coupled with a liquid outlet or drain (not shown) extending through the casing 2. The second chamber wall 62 separates or "isolates" the separator 10 from the driver 6 and preferably includes a generally disk-like body 70 with a central bore 72, the bore 72 being sized to receive a portion of the drive shaft 6. The body 70 also has annular portion 72 extending axially from a first end 70a and having an end 72a located adjacent to, but spaced from axially and radially from, the annular portion 49 of the static separator body 40 so as to define an annular inlet 52a into the collection chamber 52, as best shown in FIG. 3.

The separator 10 of the present invention is clearly advantageous over previously known separator designs. By providing the separator 10 as part of a coupler 12 for connecting the compressor and drive shafts 3, 6, the amount of space required to incorporate the separator 10 into the compressor assembly 1 is reduced. As such, the axial length of the casing 2 and the compressor or drive shafts 3, 6 may be reduced, resulting in a reduction of material and manufacturing costs and a more compact compressor design.

Although the separator 10 is primarily described and depicted as being used with a turbomachine T that is constructed as a compressor 1 with at least one impeller 5, the separator 10 may alternatively be used with any other type of turbomachine T. For example, the turbomachine T may be a turbine with one or more blade wheels providing fluid handling components H, a pump with fluid handling components H formed as one or more pump impellers, gears, lobes, etc., or any other appropriate type of turbomachine with a driven working shaft W. Thus, it is clearly within the scope of the present invention to use the separator 10 with any appropriate turbomachine.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

I claim:

1. A separator for a compressor including a casing, a primary compressor shaft disposed within the casing, at least one impeller mounted on the compressor shaft, and a drive shaft connectable with the compressor shaft, the separator comprising:

a coupler having a central axis and being configured to connect the drive shaft with the compressor shaft such that the rotation of the driver shaft rotates the coupler and connected compressor shaft; and a separation surface extending circumferentially about the axis so as to at least partially define a flow passage for a fluid stream, the separation surface being disposed one of generally within and generally about the coupler and connected with the coupler such that rotation of at least one of the two shafts rotates the separation surface generally about the axis so that liquid within the fluid stream contacting the separation surface is separated from the fluid stream.

2. The separator as recited in claim 1 wherein the coupler includes an inner tubular body and the separator further comprises an outer tubular body disposed about the inner tubular body such that the flow passage is defined between the two tubular bodies, the outer tubular body having an inner circumferential surface providing the separation surface and the inner tubular body being configured to connect the compressor shaft with the drive shaft.

3. The separator as recited in claim 2 wherein the coupler further includes a plurality of generally radially-extending connectors extending between and connecting the inner and outer tubular bodies.

4. The separator as recited in claim 2 wherein each tubular body has first and second ends, the first end of the inner tubular body being connectable with the drive shaft and the second end of the inner tubular body being connectable with the compressor shaft such that the inner body is configured to couple the two shafts.

5. The separator as recited in claim 2 wherein each tubular body has first and second ends, the first ends of two tubular bodies defining a generally annular inlet of the flow passage and the second ends of the bodies defining a generally annular outlet of the flow passage.

6. The separator as recited in claim 5 wherein the first end of the outer tubular body is spaced axially inwardly with respect to the first end of the inner tubular body, the second end of the outer tubular body is spaced axially inwardly with respect to the second end of the inner tubular body, and each of the first and second ends of the inner tubular body extend radially outwardly with respect to a remainder of the inner body such that the inlet and outlet extend at least partially radially.

7. The separator as recited in claim 6 wherein the outer tubular body further has an outer circumferential surface and at least one outlet port extending radially between the body inner and outer surfaces, the outlet port being configured to discharge liquids from the flow passage.

8. The separator as recited in claim 5 wherein the second end of the outer tubular body has a first diameter and a central portion of the outer body has a second diameter, the second diameter being greater than the first diameter such that at least a section of the separation surface is generally angled so as to direct liquids toward the body central portion.

9. The separator as recited in claim 1 further comprising a static member disposed about the coupler and having a central bore, the bore having an inner circumferential separation surface spaced radially outwardly from the coupler such that a static separation passage is defined between the static member and the coupler, the static separation surface being configured such that liquid in a fluid stream contacting the surface is separated from the stream.

10. The separator as recited in claim 9 wherein the static member includes a generally cylindrical body connected with the casing.

11. The separator as recited in claim 9 further comprising a plurality of blades disposed at least partially within the static separation passage and spaced circumferentially about the axis, each blade being configured to direct fluid contacting the blade generally circumferentially with respect to the axis.

12. The separator as recited in claim 1 wherein the coupler includes a generally tubular body having opposing axial ends, each end being configured to engage with a separate one of the drive shaft and the compressor shaft so as to couple the drive and compressor shafts.

13. The separator as recited in claim 12 wherein each body end is releasably connectable with one of the drive shaft and the compressor by a plurality of threaded fasteners.

14. A compressor assembly comprising:
a casing including an interior chamber;
a drive including a shaft, the shaft extending into the interior chamber;
at least one impeller mounted on a compressor shaft, the compressor shaft being disposed in the casing interior; and
a separator including a coupler, the coupler having a central axis and being configured to connect the drive shaft with the compressor shaft such that the rotation of the driver shaft rotates the coupler and connected compressor shaft, and a separation surface extending circumferentially about the axis so as to at least partially define a flow passage for a fluid stream, the separation surface being disposed one of generally within and generally about the coupler and connected with the coupler such that rotation of at least one of the two shafts rotates the separation surface generally about the axis so that liquid within the fluid stream contacting the separation surface is separated from the fluid stream.

15. The compressor as recited in claim 14 wherein the coupler includes an inner tubular body and the separator further comprises an outer tubular body disposed about the inner tubular body such that the flow passage is defined between the two tubular bodies, the outer tubular body having an inner circumferential surface providing the separation surface and the inner tubular body being configured to connect the compressor shaft with the drive shaft.

16. The compressor as recited in claim 15 wherein each tubular body has first and second ends, the first end of the inner tubular body being connectable with the drive shaft and the second end of the inner tubular body being connectable with the compressor shaft such that the inner body is configured to couple the two shafts.

17. The compressor as recited in claim 15 wherein each tubular body has first and second ends, the first ends of two tubular bodies defining a generally annular inlet of the flow passage and the second ends of the bodies defining a generally annular outlet of the flow passage, the first end of the outer tubular body being spaced axially inwardly with respect to the first end of the inner tubular body, the second end of the outer tubular body being spaced axially inwardly with respect to the second end of the inner tubular body, and each of the first and second ends of the inner tubular body extending radially outwardly with respect to a remainder of the inner body such that the inlet and outlet extend at least partially radially.

18. The compressor as recited in claim 14 further comprising a static member disposed about the coupler and having a central bore, the bore having an inner circumferential separation surface spaced radially outwardly from the coupler such that a static separation passage is defined between the static member and the coupler, the static separation surface being configured such that liquid in a fluid stream contacting the surface is separated from the stream.

19. The compressor as recited in claim 18 further comprising a plurality of blades disposed at least partially within the static separation passage and spaced circumferentially about the axis, each blade being configured to direct fluid contacting the blade generally circumferentially with respect to the axis.

20. A separator for a compressor including a casing, a primary compressor shaft disposed within the casing, at least one impeller mounted to the compressor shaft, and a drive shaft connectable with the compressor shaft, the separator comprising:

a coupler including an inner tubular body having a central axis and being configured to connect the drive shaft with the compressor shaft such that the rotation of the driver shaft rotates the coupler and connected compressor shaft; and an outer tubular body disposed about the inner tubular body such that a flow passage is defined between the bodies, the outer body having an inner circumferential separation surface extending about the axis such that rotation of at least one of the two shafts rotates the separation surface generally about the axis so that liquid within the fluid stream contacting the separation surface is separated from the fluid stream.

21. A separator for a turbomachine including a casing, a working shaft disposed within the casing, at least one fluid handling component mounted on the working shaft, and a drive shaft connectable with the working shaft, the separator comprising:

a coupler having a central axis and being configured to connect the drive shaft with the working shaft such that the rotation of the driver shaft rotates the coupler and connected working shaft; and a separation surface extending circumferentially about the axis so as to at least partially define a flow passage for a fluid stream, the separation surface being disposed one of generally within and generally about the coupler and connected with the coupler such that rotation of at least one of the two shafts rotates the separation surface generally about the axis so that liquid within the fluid stream contacting the separation surface is separated from the fluid stream.

* * * * *